(12) United States Patent
Qiu

(10) Patent No.: US 12,299,348 B2
(45) Date of Patent: May 13, 2025

(54) SOUND PLAYING METHOD AND DEVICE

(71) Applicant: Honor Device Co., Ltd., Shenzhen (CN)

(72) Inventor: Jianbin Qiu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/758,838

(22) PCT Filed: Jan. 18, 2022

(86) PCT No.: PCT/CN2022/072598
§ 371 (c)(1),
(2) Date: Jul. 14, 2022

(87) PCT Pub. No.: WO2022/242210
PCT Pub. Date: Nov. 24, 2022

(65) Prior Publication Data
US 2024/0220186 A1  Jul. 4, 2024

(30) Foreign Application Priority Data
May 21, 2021 (CN) .......................... 202110560657.3

(51) Int. Cl.
*G06F 3/16* (2006.01)
*A63F 13/54* (2014.01)

(52) U.S. Cl.
CPC .............. *G06F 3/165* (2013.01); *A63F 13/54* (2014.09)

(58) Field of Classification Search
CPC .......... G06F 3/16; G06F 3/165; G06F 16/635; G06F 16/40
(Continued)

(56) References Cited

U.S. PATENT DOCUMENTS 10,463,965 B2   11/2019 Li et al.
10,628,119 B2   4/2020 Li et al.
(Continued)

FOREIGN PATENT DOCUMENTS

CN   104090766 A   10/2014
CN   105959481 A   9/2016
(Continued)

OTHER PUBLICATIONS

Zhenhai, Y. et al., "Design and implementation of sound enhancement System based based on Windows platform", Audio Engineering, Mar. 9, 2016, 16 Pages.

*Primary Examiner* — Alexander Krzystan
(74) *Attorney, Agent, or Firm* — Slater Matsil, LLP

(57) ABSTRACT

A sound playing method and device, relate to the field of artificial intelligence, so as to resolve a problem that a corresponding sound cannot be played on an application that can play both a video and music by using a corresponding sound effect. A specific solution is as follows: when a category of the first application meets a preset condition, playing a sound of the current first application based on a sound effect parameter of a first sound effect corresponding to the category of the first application; or when the category of the first application does not meet the preset condition, playing the sound of the current first application based on a sound effect parameter of a second sound effect corresponding to a frame rate of a currently displayed picture.

14 Claims, 5 Drawing Sheets

(58) Field of Classification Search
USPC .......................................................... 700/94
See application file for complete search history.

(56) References Cited

U.S. PATENT DOCUMENTS

| | | | |
|---|---|---|---|
| 10,817,255 B2 | 10/2020 | Li et al. | |
| 11,100,901 B2 | 8/2021 | Peng et al. | |
| 2008/0022352 A1* | 1/2008 | Seo | H04N 21/235 348/E5.112 |
| 2009/0273712 A1* | 11/2009 | Landy | G11B 27/34 348/E9.034 |
| 2009/0290064 A1* | 11/2009 | Matsumoto | H04N 21/439 725/116 |
| 2010/0030928 A1* | 2/2010 | Conroy | G06F 21/71 710/22 |
| 2014/0123015 A1 | 5/2014 | Sako et al. | |
| 2016/0277244 A1 | 9/2016 | Reichert, Jr. | |
| 2018/0373489 A1 | 12/2018 | Gan et al. | |
| 2019/0102141 A1 | 4/2019 | Li et al. | |
| 2019/0143214 A1 | 5/2019 | Li et al. | |
| 2020/0368616 A1 | 11/2020 | Delamont | |
| 2022/0239987 A1* | 7/2022 | Gauglitz | H04N 21/2743 |
| 2022/0248160 A1 | 8/2022 | Liu | |

FOREIGN PATENT DOCUMENTS

| | | |
|---|---|---|
| CN | 106126174 A | 11/2016 |
| CN | 106325321 A | 1/2017 |
| CN | 106354471 A | 1/2017 |
| CN | 106933587 A | 7/2017 |
| CN | 109165005 A | 1/2019 |
| CN | 109388367 A | 2/2019 |
| CN | 110572720 A | 12/2019 |
| CN | 110989961 A | 4/2020 |
| CN | 111770416 A | 10/2020 |
| CN | 109196865 B | 3/2021 |
| CN | 112449229 A | 3/2021 |
| EP | 3407180 A1 | 11/2018 |
| EP | 3416040 A1 | 12/2018 |
| JP | 2009011489 A | 1/2009 |
| KR | 20120067826 A | 6/2012 |
| WO | 2008125582 A1 | 10/2008 |

* cited by examiner

SOUND PLAYING METHOD AND DEVICE

CROSS-REFERENCE TO RELATED APPLICATIONS

This application is a National Stage of International Application No. PCT/CN2022/072598, filed on Jan. 18, 2022, which claims priority to Chinese Patent Application No. 202110560657.3, filed on May 21, 2021, the disclosures of which are incorporated herein by reference in their entireties.

TECHNICAL FIELD

Embodiments of this application relate to the field of artificial intelligence, and in particular, to a sound playing method and device.

BACKGROUND

Generally, when playing a sound, a mobile phone may perform sound digital signal processing on sound data based on a sound effect parameter of a sound effect, so that a specific sound effect can be achieved when the mobile phone plays a sound by using processed sound data, that is, the mobile phone can play a sound by using the specific sound effect, and the sound played by the mobile phone is more suitable for a current sound playing scenario of the mobile phone, and user experience in playing a sound by the mobile phone is improved.

Generally, a sound effect of a mobile phone when playing a sound may include a video sound effect, a game sound effect, a music sound effect, and the like. The video sound effect is more suitable for a sound playing scenario in which the mobile phone plays a video. The game sound effect is more suitable for a sound playing scenario in which the mobile phone plays a game. The music sound effect is more suitable for a sound playing scenario in which the mobile phone plays music or plays a background sound.

Currently, when the mobile phone plays a sound, the mobile phone queries, based on a name of an application, a sound effect corresponding to a sound playing scenario in which the mobile phone plays a sound in the application, so that the mobile phone plays the sound in the application based on the sound effect. However, if the application is an integrated application, for example, the application may play both a video and audio such as music, there is more than one sound playing scenario when the mobile phone plays a sound in the application, the mobile phone cannot query, based on a name of the application, a sound effect corresponding to the sound playing scenario when the mobile phone plays the sound in the application, and only a default sound effect can be used to play the sound of the video or music in the application.

SUMMARY

Embodiments of this application provide a sound playing method and device, so as to resolve a problem that a corresponding sound cannot be played for an application that can play both a video and music by using a corresponding sound effect.

To achieve the foregoing objective, the embodiments of this application uses the following technical solutions:

According to a first aspect, an embodiment of this application provides a sound playing method, and the method may be applied to an electronic device. The method includes: when a category of the first application meets a preset condition, playing a sound of the current first application based on a sound effect parameter of a first sound effect corresponding to the category of the first application; or when the category of the first application does not meet the preset condition, playing the sound of the current first application based on a sound effect parameter of a second sound effect corresponding to a frame rate of a currently displayed picture.

By using the foregoing technical solution, when a user is using an application installed on an electronic device, the electronic device may automatically select and play a sound after processing sound data based on the category of the application used by the user and a current sound playing scenario, so that the sound played by the electronic device is more suitable for a current sound playing scenario, thereby improving user experience in playing a sound by the electronic device.

In a possible implementation, the playing a sound of the current first application based on a sound effect parameter of a first sound effect corresponding to the category of the first application includes: determining, based on the category of the first application, the first sound effect corresponding to the first application according to a preset correspondence between a category of an application and a sound effect; and playing the sound of the current first application based on the sound effect parameter of the first sound effect.

In this way, the first sound effect of the corresponding application can be easily determined according to the preset correspondence between the category of the application and the sound effect, which facilitates implementation.

In another possible implementation, the category of the application includes a game, a video, and music; and the preset correspondence between the category of an application and the sound effect includes that a sound effect corresponding to a game is a game sound effect, a sound effect corresponding to a video is a video sound effect, and a sound effect corresponding to music is an audio sound effect, and sound effect parameters configured for the video sound effect, the game sound effect, and the audio sound effect are different from each other.

In this way, applications of different categories can play a sound based on a corresponding sound effect parameter, thereby improving an effect of playing a sound by the application.

In another possible implementation, the preset condition includes: the category of the first application is any one of a game, a video, or music; or the category of the first application is a game or a video; or the category of the first application is a game.

The sounds of game, video, and music applications each are usually of a single type. For example, the sound of a gaming application is usually a sound of a game, a sound of a video application is usually a sound of a video, and a sound of a music application is usually a sound of an audio. Therefore, sound effects required by sounds of these types of applications are relatively clear and do not change, and these types of applications may directly determine sound effects based on the category of the application and play a sound by using the determined sound effect. Another type of application may include a plurality of types of sounds. For example, another type of application can play both a video and music. Therefore, another type of application determines a sound effect and plays a sound based on a frame rate, and can more accurately determine a sound effect based on a current sound playing scenario of the application.

In another possible implementation, the playing the sound of the current first application based on a sound effect parameter of a second sound effect corresponding to a frame rate of a currently displayed picture includes: determining, based on the frame rate of the currently displayed picture, the second sound effect corresponding to the first application; and playing the sound of the current first application based on the sound effect parameter of the second sound effect.

In another possible implementation, the determining, based on the frame rate of the currently displayed picture, the second sound effect corresponding to the first application includes: when the frame rate is greater than or equal to a preset frame rate, determining that the second sound effect is the video sound effect; or when the frame rate is less than the preset frame rate, determining that the second sound effect is the audio sound effect. Because the frame rate is relatively low when a still picture is displayed, when the frame rate is greater than a preset frame rate, it can be determined that a current picture includes a video picture. Therefore, a video sound effect may be used to play a current sound, so that the sound played by an electronic device when playing a video can better match the sound playing scenario of the video.

In another possible implementation, the determining, based on the frame rate of the currently displayed picture, the second sound effect corresponding to the first application includes: when the frame rate is greater than or equal to the preset frame rate, and an area proportion of a continuously refreshed area in a currently displayed picture is greater than a preset proportion threshold of a screen display area, determining that the second sound effect is the video sound effect; or when the frame rate is greater than or equal to the preset frame rate, and the area proportion of the continuously refreshed area in the currently displayed picture is less than the preset proportion threshold of the screen display area, determining that the second sound effect is the audio sound effect; or when the frame rate is less than the preset frame rate, determining that the second sound effect is the audio sound effect.

A user does not have a high requirement on the sound playing effect of a sound in an advertisement video or an information stream. Therefore, the electronic device can further determine, based on a size of a continuously refreshed area (that is, a video display area), whether to currently play a video in the advertisement video or the information stream (for example, when an area proportion of the continuously refreshed area in the currently displayed picture is less than the preset proportion threshold of the screen display area, it indicates that the video in the advertisement video or the information stream is being played), so as to determine the audio effect more accurately.

In another possible implementation, the preset proportion threshold is 50%, and the preset frame rate is 24 Hz.

According to a second aspect, an embodiment of this application provides a sound playing apparatus, and the apparatus may be applied to an electronic device, so as to implement the method according to the first aspect. Functions of the apparatus may be implemented by hardware, or may be implemented by hardware executing corresponding software. The hardware or software includes one or more modules corresponding to the foregoing functions, for example, a playing module and a processing module.

The playing module may be configured to: when a category of the first application meets a preset condition, play a sound of the current first application based on a sound effect parameter of a first sound effect corresponding to the category of the first application; or when the category of the first application does not meet the preset condition, play the sound of the current first application based on a sound effect parameter of a second sound effect corresponding to a frame rate of a currently displayed picture.

In a possible implementation, the processing module is configured to determine, based on the category of the first application, the first sound effect corresponding to the first application according to a preset correspondence between a category of an application and a sound effect; and the playing module is specifically configured to play the sound of the current first application based on the sound effect parameter of the first sound effect.

In another possible implementation, the category of the application includes a game, a video, and music; and the preset correspondence between the category of an application and the sound effect includes that a sound effect corresponding to a game is a game sound effect, a sound effect corresponding to a video is a video sound effect, and a sound effect corresponding to music is an audio sound effect, and sound effect parameters configured for the video sound effect, the game sound effect, and the audio sound effect are different from each other.

In another possible implementation, the preset condition includes: the category of the first application is any one of a game, a video, or music; or the category of the first application is a game or a video; or the category of the first application is a game.

In another possible implementation, the processing module is configured to determine, based on the frame rate of the currently displayed picture, the second sound effect corresponding to the first application; and the playing module is specifically configured to play the sound of the current first application based on the sound effect parameter of the second sound effect.

In another possible implementation, the processing module is specifically configured to: when the frame rate is greater than or equal to a preset frame rate, determine that the second sound effect is a video sound effect; or when the frame rate is less than the preset frame rate, determine that the second sound effect is an audio sound effect.

In another possible implementation, the processing module is specifically configured to: when the frame rate is greater than or equal to the preset frame rate, and an area proportion of a continuously refreshed area in a currently displayed picture is greater than a preset proportion threshold of a screen display area, determine that the second sound effect is the video sound effect; or when the frame rate is greater than or equal to the preset frame rate, and the area proportion of the continuously refreshed area in the currently displayed picture is less than the preset proportion threshold of the screen display area, determine that the second sound effect is the audio sound effect; or when the frame rate is less than the preset frame rate, determine that the second sound effect is the audio sound effect.

In another possible implementation, the preset proportion threshold is 50%, and the preset frame rate is 24 Hz.

According to a third aspect, an embodiment of this application provides an electronic device, including: a processor, and a memory configured to store an instruction that can be executed by the processor. When the processor is configured to execute the foregoing instruction, the electronic device is enabled to implement the sound playing method according to any one of the first aspect or the possible implementations of the first aspect.

According to a fourth aspect, an embodiment of this application provides a computer readable storage medium, where the computer readable storage medium stores a computer program instruction. When the computer program instruction is executed by the electronic device, the electronic device is enabled to implement the sound playing method according to any one of the first aspect or the possible implementations of the first aspect.

According to a fifth aspect, an embodiment of this application provides a computer program product, including computer readable code. When the computer readable code is run in an electronic device, the electronic device is enabled to implement the sound playing method according to any one of the first aspect or the possible implementations of the first aspect.

It should be understood that, for beneficial effects brought by the second aspect to the fifth aspect, reference should be made to related descriptions in the first aspect. Details are not described herein again.

DETAILED DESCRIPTION OF ILLUSTRATIVE EMBODIMENTS

Figure 1:
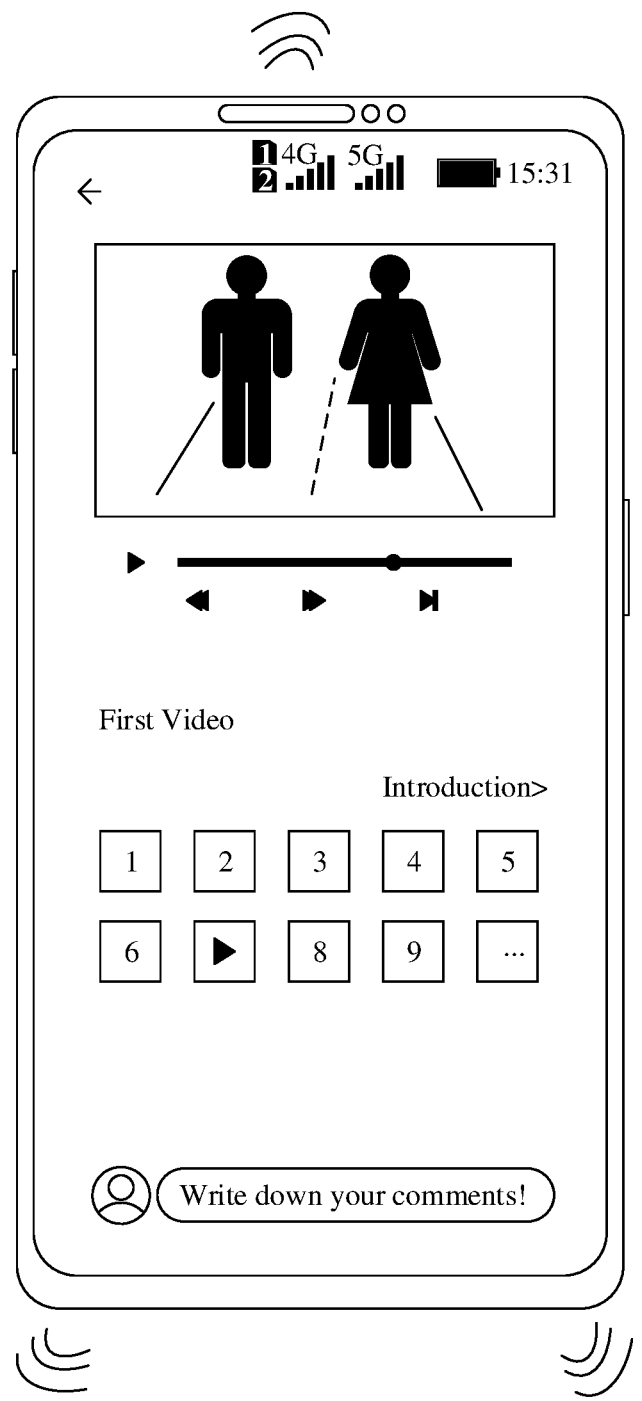
FIG. 1 is a schematic diagram of an application scenario of a sound playing method according to an embodiment of this application.

With rapid development of the Internet, more and more applications (application, APP) can be installed on an electronic device (for example, a mobile phone, a tablet, or a notebook computer) for use by a user. Various applications provide abundant functions for electronic devices. When the user watches a video, listens to music, or plays a game on an electronic device by using an application, the electronic device generally plays a sound for the user.

For example, the user may install a music application on the electronic device, and then play music on the electronic device by using the music application. In this case, the electronic device plays a sound of the music. Alternatively, the user may install a video application on the electronic device, and then play a video on the electronic device by using the video application. In this case, the electronic device plays a sound of the video. Alternatively, the user may install a gaming application on the electronic device, and then play a game on the electronic device by using the gaming application. In this case, the electronic device plays a sound of the game. Alternatively, the user may install a social networking application on the electronic device, and then use the electronic device to publish or view information (such as blogs and dynamics) on a network or chat with another person by using the social networking application. When the information viewed by the user or the content chatted with another person includes a to-be-played video or audio, the electronic device also plays a sound. Alternatively, the user may install an information application on the electronic device, and then browse information (such as news) on the electronic device by using the information application. If the information browsed by the user is audio or a video, the electronic device plays a sound corresponding to the audio or video.

Generally, when the electronic device plays a sound, the electronic device may determine, based on a name of the current application, a sound playing scenario (for example, a video playing scenario, an audio playing scenario, or a gaming scenario) in which the electronic device plays the sound of the current application, so as to select a sound effect corresponding to the video playing scenario, the audio playing scenario, or the gaming scenario. The electronic device may perform sound digital signal processing on the sound data based on the selected sound effect parameter, so that the electronic device plays the sound based on to the selected sound effect corresponding to the sound playing scenario. In this way, the sound played by the electronic device is more suitable for the current sound playing scenario, and user experience in playing the sound by the electronic device is improved. For example, the sound effect of the electronic device may include a video sound effect, an audio sound effect, a game sound effect, and the like. When the user watches a video by using a video application installed on the electronic device, the electronic device may determine, based on a name of the video application used by the user, that a sound playing scenario in which a sound of the current application is played is a video playing scenario, so as to select a video sound effect. After processing, based on the sound effect parameter corresponding to the selected video sound effect, the sound data of the video that is being played, the electronic device can play, by using the video sound effect, the sound of the video that is being played. In this way, the sound played by the electronic device is more suitable for the video playing scenario. When the user listens to music by using a music application installed on the electronic device, the electronic device may determine, based on a name of the music application used by the user, that the sound playing scenario in which the sound of the current application is played is an audio playing scenario, so as to select an audio sound effect. After processing, based on the sound effect parameter corresponding to the selected audio sound effect, the sound data of the music being played, the electronic device can play, by using the audio sound effect, the sound of the music that is being played. In this way, the sound played by the electronic device is more suitable for the audio playing scenario. When the user uses a gaming application installed on the electronic device to play a game, the electronic device may determine, based on a name of the gaming application used by the user, that the sound playing scenario in which the sound of the current application is played is a gaming scenario, so as to select a game sound effect. After processing, based on the sound effect parameter corresponding to the selected sound effect of the game, the sound data of the running game, the electronic device can play the sound of the running game by using the sound effect of the game. In this way, the sound played by the electronic device is more suitable for the gaming scenario.

It can be learned from the foregoing that, at present, when the electronic device plays a sound, the electronic device determines, based on a name of an application, a sound playing scenario and a corresponding sound effect of the application. However, if the application is an integrated application, for example, the application may play both video and audio such as music, there more than one sound playing scenario when the electronic device plays a sound in the application, the electronic device cannot determine, based on a name of the application, a sound playing scenario in which the sound of the application is played, and only a default sound effect can be used to play the sound of the video or music in the application.

To resolve the foregoing problem, an embodiment of this application provides a sound playing method. The method may be applied to a scenario in which the electronic device plays a sound in the application when the user uses the application installed on the electronic device. For example, FIG. 1 is a schematic diagram of an application scenario of a sound playing method according to an embodiment of this application. As shown in FIG. 1, when a user watches a video by using a video application installed on an electronic device (such as a mobile phone shown in the figure), the electronic device may display a picture of the video and play a sound in the video. In this scenario, the electronic device may play a sound in the video based on a sound effect corresponding to a video playing scenario by using the sound play method provided in this embodiment of this application.

The sound playing method may include: when a category of an application (for example, a first application) meets a preset condition, playing a sound of the current first application based on a sound effect parameter of a first sound effect corresponding to the category of the application; or when the category of the application does not meet the preset condition, playing the sound of the current application based on a sound effect parameter of a second sound effect corresponding to a frame rate of a currently displayed picture. For example, when the user enables an application (for example, the first application) installed on the electronic device, the electronic device may determine, based on the category of the application enabled by the user, a default sound effect (or referred to as a first sound effect) when the electronic device plays a sound in the application; and when the electronic device is running the application enabled by the user, the electronic device may determine, based on the frame rate of the displayed picture, a sound effect (or referred to as a second sound effect) corresponding to the current sound playing scenario, so that the electronic device can play the sound in the application enabled by the user based on the determined first sound effect or the determined second sound effect corresponding to the application. When the determined second sound effect is the same as the first sound effect, the electronic device may directly play the sound in the current sound playing scenario by using the first sound effect, and a corresponding sound effect does not need to be re-loaded.

It should be noted that the sound playing scenario is an application scenario of the electronic device when the electronic device plays the sound. For example, when the electronic device plays only a sound of an audio (such as music, a podcast, a broadcast, or an audio book), the current sound playing scenario of the electronic device is an audio playing scenario; when the electronic device plays a sound of a video (such as a short video, a movie, or a television program), the current sound playing scenario of the electronic device is a video playing scenario; and when the electronic device plays a sound of a game when running a gaming application, a current sound playing scenario of the electronic device is a gaming scenario.

Generally, a sound effect may include an audio sound effect, a video sound effect, and a game sound effect, and the sound effect parameters of different sound effects are different (that is, different sound effect parameters are configured for different sound effects). The sound effects and the sound playing scenarios may be in a one-to-one correspondence with each other. For example, an audio playing scenario is corresponding to an audio sound effect, a video playing scenario is corresponding to a video sound effect, and a gaming scenario is corresponding to a game sound effect. The electronic device may determine a corresponding sound effect according to the correspondence based on a sound playing scenario.

In this way, when the user is using the application installed on the electronic device, the electronic device may automatically select and use, based on a category of the application used by the user and a current sound playing scenario, corresponding sound effect parameters to process the sound data and play a sound, so that the sound played by the electronic device is more suitable for the current sound playing scenario, thereby improving user experience in playing the sound by the electronic device.

The following describes, with reference to the accompanying drawings, the sound playing methods provided in the embodiments of this application.

In the embodiments of this application, the foregoing electronic device may be a mobile phone, a tablet computer, a handheld computer, a PC, a cellular phone, a personal digital assistant (personal digital assistant, PDA), a wearable device (such as a smartwatch or a smart band), a smart home device (such as a television set), a vehicle (such as a vehicle-mounted computer), a smart screen, a game console, a smart sound box, a smart projector, a smart set top box, an augmented reality (augmented reality, AR)/virtual reality (virtual reality, VR) device, or the like. The embodiments of this application impose no special limitation on a specific device form of the electronic device.

Figure 2:
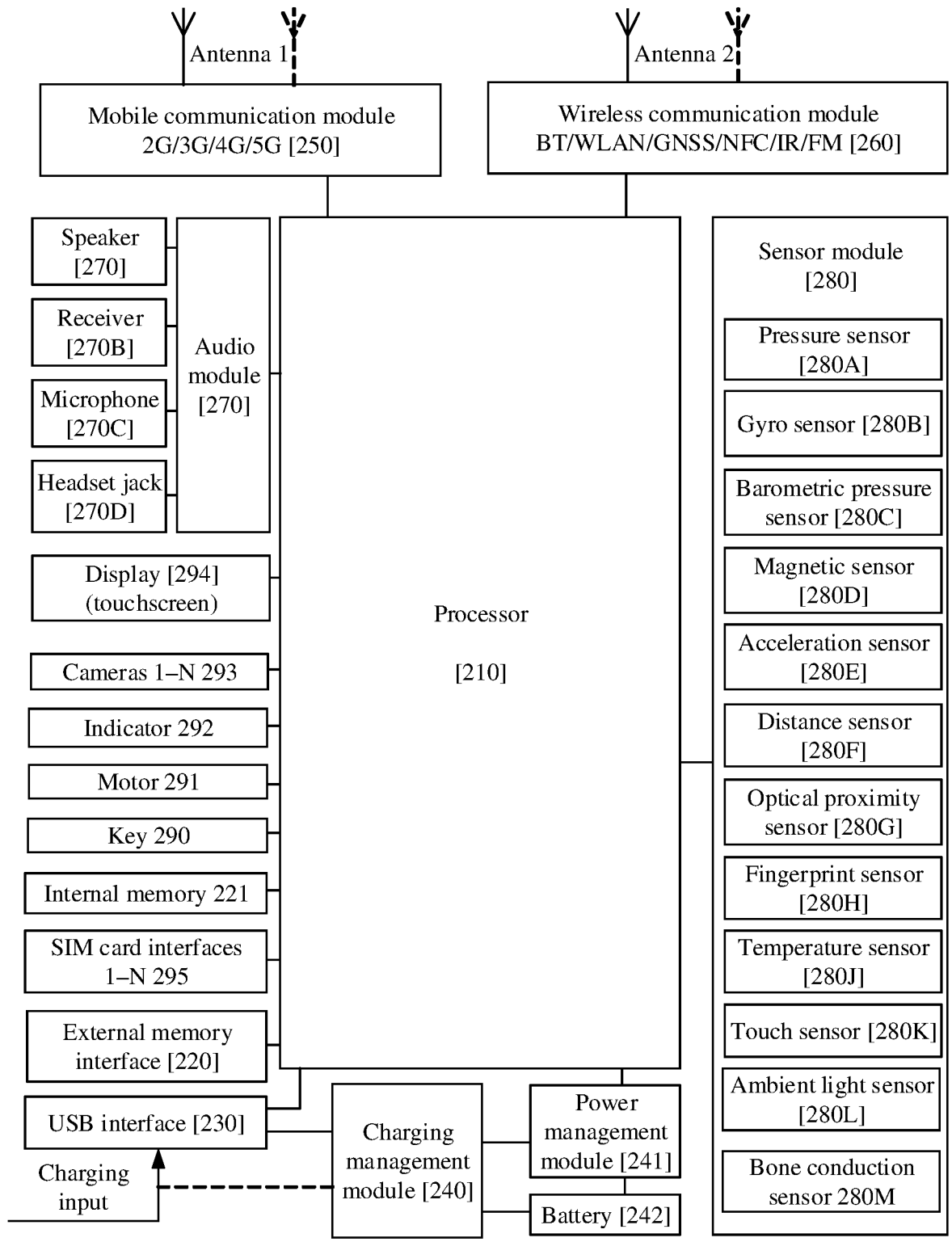
FIG. 2 is a schematic diagram of a structure of an electronic device according to an embodiment of this application.

For example, the electronic device is a mobile phone. FIG. 2 is a schematic diagram of a structure of an electronic device according to an embodiment of this application. That is, for example, the electronic device shown in FIG. 2 may be a mobile phone.

As shown in FIG. 2, the electronic device may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a key 290, a motor 291, an indicator 292, a camera 293, a display 294, a subscriber identity module (subscriber identity module, SIM) card interface 295, and the like. The sensor module 280 may include a pressure sensor 280A, a gyro sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It can be understood that the structure illustrated in this embodiment does not constitute a specific limitation on the electronic device. In some other embodiments, the electronic device may include more or fewer components than those shown in the figure, combine some components, split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a never center and a command center of the electronic device. The controller may generate an operation control signal based on an instruction operation code and a time sequence signal, so as to control instruction retrieval and instruction execution.

A memory may be further disposed in the processor 210 to store an instruction and data. In some embodiments, the memory in the processor 210 is a cache memory. The memory can store an instruction or data that the processor 210 has just used or used cyclically. If the processor 210 needs to use the instruction or data again, the instruction or data can be directly invoked from the memory. Repeated access is avoided, and a waiting time of the processor 210 is reduced, thereby improving system efficiency.

In some embodiments, the processor 210 may include one or more interfaces. The interface may be an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, a universal serial bus (universal serial bus, USB) interface, and/or the like.

The charging management module 240 is configured to receive a charging input from a charger. The charger may be a wireless charger, or may be a wired charger. In some wired charging embodiments, the charging management module 240 may receive a charging input of the wired charger by using the USB interface 230. In some embodiments of wireless charging, the charging management module 240 can receive a wireless charging input by using a wireless charging coil of the electronic device. When charging the battery 242, the charging management module 240 can further supply power to the electronic device by using the power management module 241.

The power management module 241 is configured to connect the battery 242, the charging management module 240, and the processor 210. The power management module 241 receives an input of the battery 242 and/or an input of the charging management module 240, and supplies power to the processor 210, the internal memory 221, the display 294, the camera 293, the wireless communication module 260, and the like. The power management module 241 may be further configured to monitor parameters such as a battery capacity, a quantity of battery cycles, and a battery health state (leakage or impedance). In some other embodiments, the power management module 241 may alternatively be disposed in the processor 210. In some other embodiments, the power management module 241 and the charging management module 240 may alternatively be disposed in the same device.

The wireless communication function of the electronic device may be implemented by using the antenna 1, the antenna 2, the mobile communication module 250, the wireless communication module 260, the modem processor, the baseband processor, and the like.

The antenna 1 and the antenna 2 are configured to transmit and receive electromagnetic wave signals. Each antenna in the electronic device may be configured to cover one or more communication frequency bands. Different antennas may further be multiplexed to improve antenna utilization. For example, the antenna 1 may be multiplexed into a diversity antenna of a wireless local area network. In some other embodiments, the antenna may be used in combination with a tuning switch.

The mobile communication module 250 can provide a wireless communication solution including 2G/3G/4G/5G and the like applied to the electronic device. The mobile communication module 250 may include at least one filter, a switch, a power amplifier, a low noise amplifier (low noise amplifier, LNA), and the like. The mobile communication module 250 can receive an electromagnetic wave by using the antenna 1, perform processing such as filtering and amplification on the received electromagnetic wave, and transmit the processed electromagnetic wave to the modem processor for demodulation. The mobile communication module 250 can further amplify a signal that is modulated by the modem processor, and the signal is converted into an electromagnetic wave and radiated by the antenna 1. In some embodiments, at least some functional modules of the mobile communication module 250 may be disposed in the processor 210. In some embodiments, at least some functional modules of the mobile communication module 250 and at least some modules of the processor 210 may be disposed in the same device.

The wireless communication module 260 may provide a wireless communication solution that is applied to the electronic device, including wireless local area network (wireless local area network, WLAN) (such as a wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication, NFC), infrared (infrared, IR), and the like. The wireless communication module 260 may be one or more devices integrating at least one communication processing module. The wireless communication module 260 receives an electromagnetic wave by using the antenna 2, performs frequency modulation and filtering on the electromagnetic wave signal, and sends the processed signal to the processor 210. The wireless communication module 260 can further receive a to-be-sent signal from the processor 210, and perform frequency modulation and amplification on the signal, and the signal is converted into an electromagnetic wave and radiated by the antenna 2.

In some embodiments, the antenna 1 of the electronic device is coupled to the mobile communication module 250, and the antenna 2 is coupled to the wireless communication module 260, so that the electronic device may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device implements a display function by using the GPU, the display 294, the application processor, and the like. The GPU is an image processing microprocessor, which is connected to the display 294 and the application processor. The GPU is configured to perform mathematical and geometric calculations to render graphics. The processor 210 may include one or more GPUs that execute a program instruction to generate or change display information.

The display 294 is configured to display an image, a video, and the like. The display 294 includes a display panel. The display panel may be a liquid crystal display (liquid crystal display, LCD), an organic light emitting diode (organic light-emitting diode, OLED), an active matrix organic light emitting diode (active-matrix organic light emitting diode, AMOLED), a flex light emitting diode (flex light-emitting diode, FLED), a Miniled, a MicroLed, a Micro-oLed, a quantum dot light emitting diodes (quantum dot light emitting diode, QLED), or the like. In some embodiments, the electronic device may include 1 or N displays 294, where N is a positive integer greater than 1.

The electronic device can implement a photographing function by using the ISP, the camera 293, the video codec, the GPU, the display 294, the application processor, and the like.

The digital signal processor is configured to process a digital signal. In addition to processing a digital image signal, the digital signal processor can further process another digital signal. For example, when the electronic device selects a frequency, the digital signal processor is configured to perform Fourier transform or the like on energy of the frequency.

The video codec is configured to compress or decompress a digital video. The electronic device can support one or more video codecs. In this way, the electronic device may play or record a video in a plurality of encoding formats, such as moving picture experts group (MPEG) 1, MPEG 2, MPEG3, and MPEG4.

The NPU is a neural-network (neural-network, NN) computing processor. By referring to a structure of a biological neural network, such as a transfer mode between human brain neurons, the NPU quickly processes input information, and can further perform continuous self-learning. Applications such as intelligent recognition of electronic devices may be implemented by using NPU, for example: Image recognition, face recognition, voice recognition, and text understanding.

The internal memory 221 may be configured to store computer executable program code, where the executable program code includes an instruction. The processor 210 executes various function applications and data processing of the electronic device by running an instruction stored in the memory 221. The internal memory 221 may include a program storage area and a data storage area. The program storage area may store an operating system, an application required by at least one function (such as a sound play function or an image play function), or the like. The data storage area may store data (such as audio data or a phone book) created during use of the electronic device. In addition, the internal memory 221 may include a high-speed random access memory, and may further include a non-volatile memory, such as at least one magnetic disk storage device, a flash memory device, or a universal flash storage (universal flash storage, UFS).

The electronic device can implement audio functions (such as music playing and sound recording) by using the audio module 270, the speaker 270A, the receiver 270B, the microphone 270C, the headset jack 270D, the application processor, and the like.

The audio module 270 is configured to convert digital audio information into an analog audio signal for output, and is further configured to convert an analog audio input into a digital audio signal. The audio module 270 may be further configured to encode and decode audio signals. In some embodiments, the audio module 270 may be disposed in the processor 210, or some of the functional modules of the audio module 270 may be disposed in the processor 210.

The speaker 270A is configured to convert an audio electrical signal into a sound signal. The electronic device can listen to music by using the speaker 270A, or receive a hands-free call.

The receiver 270B is configured to convert an audio electrical signal into a sound signal. When the electronic device receives a call or a voice message, the receiver 270B can be placed close to an ear to receive the voice.

The microphone 270C, also referred to as a "loud-speaker", is configured to convert a sound signal into an electrical signal. When making a call, sending a voice message, or performing an event by using a voice assistant, the user can make the mouth approach the microphone 270C and emit a sound, so as to input a sound signal to the microphone 270C. The electronic device may be provided with at least one microphone 270C. In some other embodiments, the electronic device may be provided with two microphones 270C, which can implement noise reduction function in addition to collecting sound signals. In some other embodiments, the electronic device may alternatively be provided with three, four, or more microphones 270C to implement functions such as sound signal collection, noise reduction, sound source recognition, and directional recording.

The touch sensor 280K is also referred to as a "touch panel". The touch sensor 280K may be disposed on the display 294, and the touch sensor 280K and the display 294 form a touchscreen, which is also referred to as a "touch-controlled screen". The touch sensor 280K is configured to detect a touch operation performed on or near the touch sensor 280K. The touch sensor can transmit a detected touch operation to the application processor to determine a type of a touch event. The display 294 may be configured to provide a visual output related to the touch operation. In some other embodiments, the touch sensor 280K may alternatively be disposed on a surface of the electronic device, which is different from the position of the display 294.

The key 290 includes a power-on key, a volume key, or the like. The key 290 may be a mechanical key, or may be a touch key. The electronic device can receive a key input, and generate a key signal input related to user setting and function control of the electronic device.

The motor 291 can generate a vibration prompt. The motor 291 may be used for an incoming call vibration prompt, or may be used for touch vibration feedback. For example, a touch operation performed on different applications (such as photographing and audio playing) may be corresponding to different vibration feedback effects. In response to touch operations that act on different areas of the display 294, the motor 291 may also be corresponding to different vibration feedback effects. Different application scenarios (such as time reminding, receiving information, alarm clock, and gaming) may also be corresponding to different vibration feedback effects. Touch vibration feedback effects can also support customization.

Certainly, it can be understood that FIG. 2 is merely an example for description when a form of an electronic device is a mobile phone. If the electronic device is a tablet computer, a handheld computer, a PC, a PDA, or a wearable device (for example, a smartwatch or a smart band), a smart home device (such as a television set), a vehicle (such as a When the electronic device is in another device form such as a vehicle-mounted computer), a smart screen, a game console, and an AR/VR device, the electronic device may include less structures than those shown in FIG. 2, or may include more structures than those shown in FIG. 2, which is not limited herein.

The methods in the following embodiments may be implemented in an electronic device having the foregoing hardware structure. The following uses an example to describe the embodiments of this application with reference to the accompanying drawings.

Figure 3:
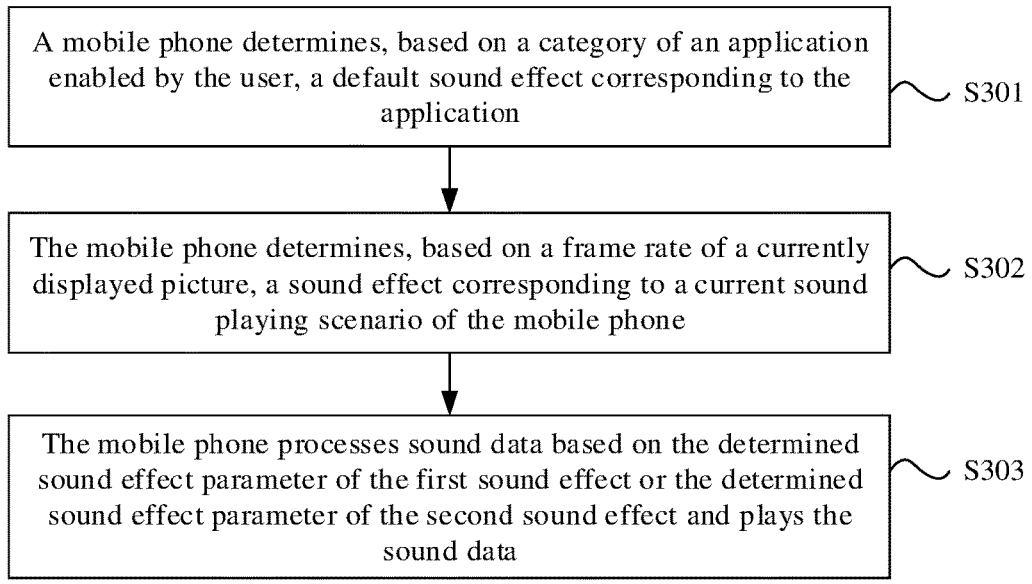
FIG. 3 is a schematic flowchart of a sound playing method according to an embodiment of this application.

An electronic device is used as an example of a mobile phone. FIG. 3 is a schematic flowchart of a sound playing method and a device according to the embodiments of this application. As shown in FIG. 3, the sound playing method may include the following S301 to S303.

When the user enables (or starts) an application (for example, a first application) for use, the electronic device (for example, a mobile phone) may determine, based on a category of the application enabled by the user, a default sound effect corresponding to the application. For example, a mobile phone is used as an example. The mobile phone may perform the following S301.

S301. The mobile phone determines, based on the category of an application started by the user, the default sound effect (or referred to as a first sound effect) corresponding to the application.

In some possible implementations, different applications may be classified, and different sound effects (that is, default sound effects) may be correspondingly determined for different types of applications. For example, a correspondence between a category of an application and a default sound effect of the application may be preset. The mobile phone may obtain a package name (or name) of the application, and then determine, based on the package name (or name) of the application, the category of the application, so as to determine the default sound effect corresponding to the application based on the determined application category and the preset correspondence. Determining, by the mobile phone, the category of the application may be presetting an application category list including the application package name (or name), so that the mobile phone may query the list, so as to determine the category of the application based on the package name (or name) of the application. Alternatively, the mobile phone may obtain attribute information (such as a file size, a category, developer information, and version information of the application) of the application from an application market based on a package name (or a name) of the application, and determine the category of the application based on the attribute information. Alternatively, the mobile phone may intelligently identify the category of the application based on the package name (or name) of the application.

For example, a sound effect may include a game sound effect, an audio sound effect (or referred to as a music sound effect), a video sound effect, and the like. The category of the application may include a game (that is, a category of each gaming application), music (that is, a category of an application mainly used for playing music), a video (that is, a category of an application mainly used for playing video), and another category (that is, a category of another application except the foregoing category, such as a news application or a chat application).

Correspondences between categories of applications and default sound effects of the applications may be as follows: A default sound effect corresponding to a gaming application is a game sound effect; a default sound effect corresponding to a music application is an audio sound effect; and a default sound effect corresponding to a video application is a video sound effect. The default sound effect corresponding to the application of another category is an audio sound effect.

In another possible implementation, a correspondence between a package name (or name) of different applications and a default sound effect of the application may be directly preset. After obtaining the package name (or name) of the application, the mobile phone may directly determine, according to the foregoing correspondence, the default sound effect corresponding to the application based on the package name (or name) of the application.

When the user uses the application enabled by the user, the electronic device may determine, based on a frame rate of the displayed picture, a sound effect (or referred to as a second sound effect) corresponding to a current sound playing scenario of the electronic device. For example, a mobile phone is used as an example. The mobile phone may perform the following S302.

S302. The mobile phone determines, based on a frame rate of a currently displayed picture, the sound effect (or referred to as the second sound effect) corresponding to the current sound playing scenario of the mobile phone.

The frame rate of the displayed picture is a quantity of frames refreshed within one second of the currently displayed picture of the mobile phone. Optionally, before S302, a frame rate of a currently displayed picture may be first obtained.

For example, a correspondence between a frame rate of the displayed picture and a sound effect may be preset, so that the mobile phone can determine, according to the foregoing correspondence, the sound effect corresponding to the current sound playing scenario of the mobile phone based on the frame rate of the currently displayed picture.

For example, when the frame rate of the displayed picture is greater than or equal to the preset frame rate, for example, when the frame rate of the displayed picture is 24 Hz or 30 Hz (generally, the frame rate of a video is greater than or equal to 24 Hz, and therefore, when the frame rate of the displayed picture is 24 Hz or higher, it indicates that the mobile phone is currently displaying a video, that is, playing the video, and the current sound playing scenario of the mobile phone is a video playing scenario), the mobile phone can determine that the sound effect corresponding to the current sound playing scenario (that is, the video playing scenario) is a video sound effect. When the frame rate of the displayed picture is less than 24 Hz (generally, the frame rate of a video is greater than or equal to 24 Hz, and therefore, when the frame rate of the displayed picture is less than 24 Hz, it indicates that the picture that is being displayed by the mobile phone does not include a video, and the mobile phone plays only a sound of an audio, that is, the current sound playing scenario of the mobile phone is an audio playing scenario), the mobile phone can determine that a sound effect corresponding to the current sound playing scenario (that is, an audio playing scenario) is an audio sound effect. When the frame rate of the displayed picture is the highest frame rate supported by the mobile phone in current performance (generally, the frame rate of a gaming picture of the gaming application is the highest frame rate supported by the mobile phone in current performance, and therefore, when the frame rate of the displayed picture is the highest frame rate of the mobile phone in the current performance, it indicates that the mobile phone is currently displaying the gaming picture, that is, the mobile phone is running a gaming application, and a current sound playing scenario is a gaming scenario), the mobile phone can determine that a sound effect corresponding to the current sound playing scenario is a game sound effect.

In some possible implementations, based on the foregoing example, the mobile phone can further determine a sound effect corresponding to the current sound playing scenario based on the frame rate of the currently displayed picture and a size of an area (that is, a dynamic area in the displayed picture) continuously refreshed in the currently displayed picture.

For example, when the frame rate of the displayed picture is greater than or equal to a preset frame rate, for example, 24 Hz (or 30 Hz), and an area proportion of a continuously refreshed area in the displayed picture is greater than a preset proportion threshold (for example, 50%) of a screen display area of the mobile phone (when the frame rate is greater than 24 Hz, it indicates that the mobile phone is currently playing a video, and a continuously refreshed area in the displayed picture is a video display area. Therefore, in this case, it indicates that the user is likely to be in full-screen or focus on watching the video), and the mobile phone can determine that an audio effect corresponding to the current sound playing scenario is a video effect. However, when the frame rate of the displayed picture is greater than or equal to 24 Hz and the area of the continuously refreshed area in the displayed picture is less than half of the screen display area of the mobile phone (when the frame rate is greater than 24 Hz, it indicates that the mobile phone is currently playing a video, and the continuously refreshed area in the displayed picture is the video display area, and therefore, it indicates that the video currently being played by the mobile phone is probably a video in the information stream when the user uses the application to browse the information stream; in this case, the user browses relatively quickly and does not have a high requirement on the sound effect of the video; alternatively, a display area of an advertisement video in an application is generally very small, and therefore, when an area of a continuously refreshed area in a displayed picture is less than half of the screen display area of the mobile phone, it indicates that currently displayed video is most likely an advertisement video), the mobile phone can determine that a sound effect corresponding to a current sound playing scenario is a default sound effect (that is, the default sound effect determined in S301), that is, the mobile phone determines that a current sound is subsequently played by using the default sound effect, that is, the mobile phone determines that the sound effect corresponding to the current sound playing scenario is the same as the default sound effect (that is, the first sound effect). When the frame rate of the displayed picture is greater than or equal to 24 Hz (or 30 Hz), and an area of the continuously refreshed area in the displayed picture is equal to half of the screen display area of the mobile phone, the mobile phone can determine that the sound effect corresponding to the current sound playing scenario is a video sound effect or a default sound effect. It should be noted that, in some other embodiments, when an area of the continuously refreshed area in the displayed picture is less than half of the screen display area, the mobile phone can directly determine that a currently corresponding sound effect is an audio sound effect.

Figure 4:
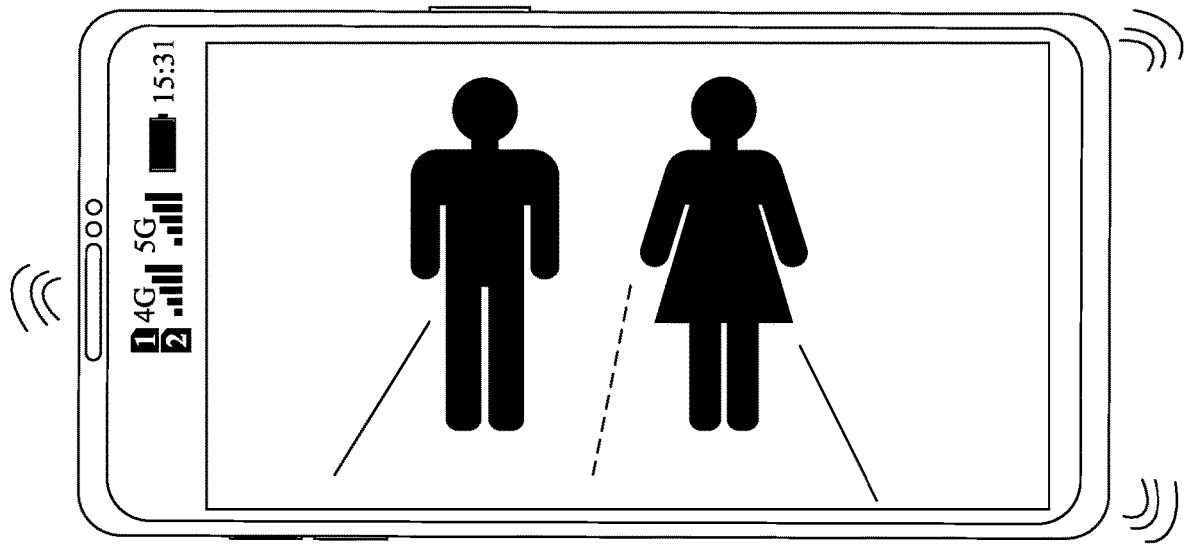
FIG. 4 is a schematic diagram of an application scenario of a sound playing method according to an embodiment of this application.

For example, as shown in FIG. 4, the mobile phone displays the video being played in full screen. In this case, the frame rate of the displayed picture of the mobile phone is equal to 24 Hz, and an area of the continuously refreshed area in the displayed picture is greater than half of the screen display area of the mobile phone. Therefore, in this case, the mobile phone can determine that a sound effect corresponding to the current sound playing scenario is a video sound effect.

Figure 5:
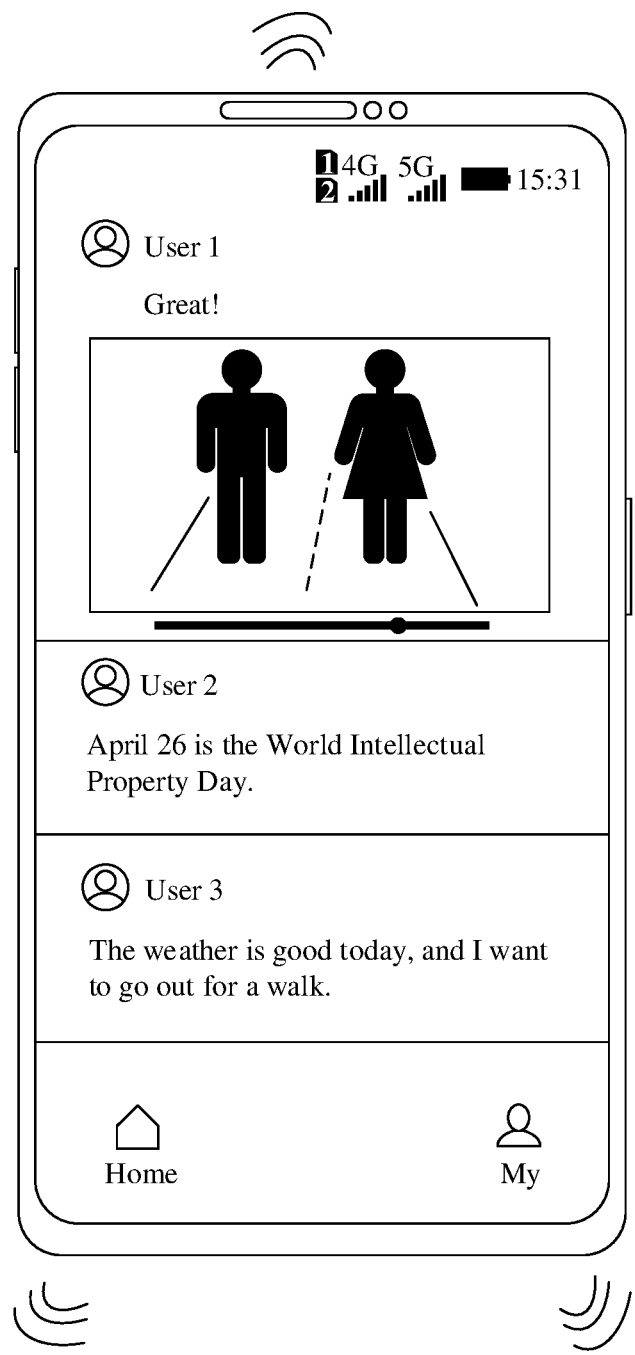
FIG. 5 is a schematic diagram of another application scenario of a sound playing method according to an embodiment of this application.

For another example, as shown in FIG. 5, the mobile phone displays an information stream, and the information stream includes a video that is being played. In this case, the frame rate of the displayed picture of the mobile phone is equal to 24 Hz, and an area of a display area occupied by the video is less than half of the screen display area of the mobile phone. Therefore, in this case, the mobile phone can determine that the sound effect corresponding to the current sound playing scenario is a default sound effect, that is, the sound effect is the same as the default sound effect, or the mobile phone can directly determine to use the audio sound effect.

S303. The mobile phone processes sound data based on the determined sound effect parameter of the first sound effect or the determined sound effect parameter of the second sound effect and plays the sound data.

Sound effect parameters are control parameters of different frequency bands in the sound data. Loudness of different frequency bands in the sound played by the electronic device can be adjusted by adjusting the sound effect parameters. For example, the sound effect parameters may include a super bass parameter used to control the loudness of a mid-bass frequency band in the sound, a bass parameter used to control the loudness of a bass frequency band in the sound, a midrange parameter used to control the loudness of a mid-range frequency band in the sound, a treble parameter used to control the loudness of a treble frequency band in the sound, a super treble parameter used to control the loudness of a treble frequency band in the sound, and the like. Generally, a greater value of a sound effect parameter indicates a higher loudness of the corresponding frequency band controlled. Different sound effects are corresponding to different sound effect parameters. In this embodiment of this application, corresponding sound effect parameters may be set for different sound effects based on professional sound effect tuning knowledge, or may be set based on normal values of the sound effect parameters of different sound effects. This is not limited herein. For example, the values of the treble parameter and the super treble parameter in the video sound effect are smaller than the values of other parameters, so that the loudness of the treble frequency band and the loudness of the super treble frequency band in the sound played by using the video sound effect are lower. This avoids the noise-dominant treble frequency band and super treble frequency band in the video from being amplified, thereby reducing noise and reducing power consumption (saving power consumed for playing noise).

In an example, after determining the default sound effect (that is, the first sound effect) in S301, the mobile phone may first load the sound effect. If the default sound effect determined by the mobile phone is the same as the sound effect (that is, the second sound effect) that is corresponding to the current sound playing scenario and that is determined in S302, the mobile phone may directly play the current sound by using the first sound effect (that is, play the current sound by using the second sound effect), and sound effect reloading is not needed. This saves the time required for sound effect loading, and prevents a current sound from being interrupted due to sound effect switching. If the determined second sound effect is different from the first sound effect, the second sound effect may be used to play the current sound, so as to improve matching between the sound effect used by the current sound and the current sound playing scenario.

In some possible implementations, after the mobile phone determines, in S302, the sound effect corresponding to the current sound playing scenario and the mobile phone plays the sound by using the sound effect, before the sound content is played, the mobile phone may no longer determine the corresponding sound effect by performing S302. This avoids sound effect switching of the mobile phone when the frame rate of the displayed picture or the area of the continuously refreshed area in the displayed picture changes. This also avoids increasing of the power consumption when the mobile phone obtains the frame rate of the displayed picture in real time when playing a sound.

It should be noted that, in some other embodiments, when the default sound effect determined in S301 is a game sound effect or a video sound effect (that is, when the category of the application is a game or a video), or when the category of the application is not another category, or when the category of the application is a game, the mobile phone may directly perform S303 without performing S302. For example, when the mobile phone determines, based on a package name (or a name) of an application enabled by the user, that the application is a gaming application, the mobile phone directly determines to play a sound in the application by using the game sound effect (that is, play the current sound by using the first sound effect), and does not determine, in real time based on the frame rate of the displayed picture, the sound effect corresponding to the current sound playing scenario of the mobile phone. Alternatively, when the mobile phone determines, based on the package name (or the name) of the application enabled by the user, that the application is a video application, the mobile phone directly determines to play the sound in the application by using the video sound effect, and does not determine, in real time based on the frame rate of the displayed picture, the sound effect corresponding to the current sound playing scenario of the mobile phone. This reduces data processing pressure when the mobile phone runs a gaming application or a video application, reduces impact on game and video performance of the mobile phone, and reduces power consumption. Correspondingly, when the category of the application is not a game or a video, or when the category of the application is another category, or when the category of the application is not a game, the mobile phone may directly perform S302 without performing S301, that is, determine the corresponding sound effect (that is, the second sound effect) based on the frame rate of the currently displayed picture of the mobile phone, so as to play a current sound of the application by using the second sound effect.

By using the method in the foregoing embodiment, when the user is using an application installed on the electronic device, the electronic device may automatically select and use, based on the category of the application used by the user and the current sound playing scenario, the sound effect parameters of a corresponding sound effect to process the sound data and then play the sound, so that the sound played by the electronic device is more suitable for the current sound playing scenario, thereby improving user experience in playing the sound by the electronic device.

Figure 6:
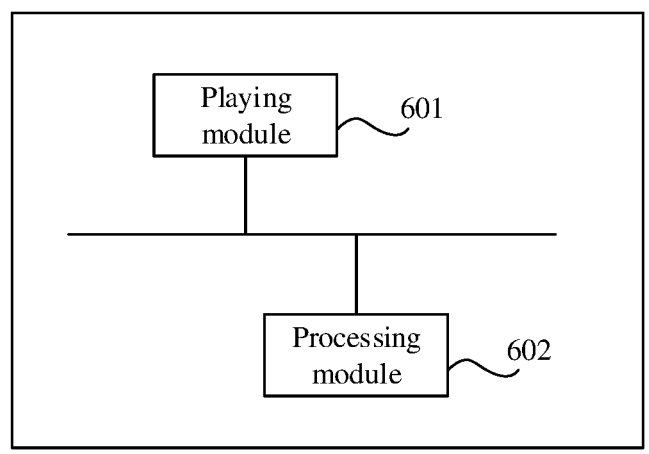
FIG. 6 is a schematic diagram of a structure of a sound playing apparatus according to an embodiment of this application.

Corresponding to the method in the foregoing embodiment, an embodiment of this application further provides a sound playing apparatus. The apparatus may be applied to an electronic device, and is configured to implement the method in the foregoing embodiment. Functions of the apparatus may be implemented by hardware, or may be implemented by hardware executing corresponding software. The hardware or software includes one or more modules corresponding to the foregoing functions. For example, FIG. 6 is a schematic diagram of a structure of a sound playing apparatus. As shown in FIG. 6, the apparatus includes: a playing module 601, a processing module 602, and the like.

The playing module 601 may be configured to: when a category of the first application meets a preset condition, play a sound of the current first application based on a sound effect parameter of a first sound effect corresponding to the category of the first application; or when the category of the first application does not meet the preset condition, play the sound of the current first application based on a sound effect parameter of a second sound effect corresponding to a frame rate of a currently displayed picture.

In a possible implementation, the processing module 602 is configured to determine, based on the category of the first application, the first sound effect corresponding to the first application according to a preset correspondence between a category of an application and a sound effect; and the playing module 601 is specifically configured to play the sound of the current first application based on the sound effect parameter of the first sound effect.

In another possible implementation, the category of the application includes a game, a video, and music; and the preset correspondence between the category of an application and the sound effect includes that a sound effect corresponding to a game is a game sound effect, a sound effect corresponding to a video is a video sound effect, and a sound effect corresponding to music is an audio sound effect, and sound effect parameters configured for the video sound effect, the game sound effect, and the audio sound effect are different from each other.

In another possible implementation, the preset condition includes: the category of the first application is any one of a game, a video, or music; or the category of the first application is a game or a video; or the category of the first application is a game.

In another possible implementation, the processing module 602 is configured to determine, based on the frame rate of the currently displayed picture, the second sound effect corresponding to the first application; and the playing module 601 is specifically configured to play the sound of the current first application based on the sound effect parameter of the second sound effect.

In another possible implementation, the processing module 602 is specifically configured to: when the frame rate is greater than or equal to a preset frame rate, determine that the second sound effect is a video sound effect; or when the frame rate is less than the preset frame rate, determine that the second sound effect is an audio sound effect.

In another possible implementation, the processing module 602 is specifically configured to: when the frame rate is greater than or equal to the preset frame rate, and an area proportion of a continuously refreshed area in a currently displayed picture is greater than a preset proportion threshold of a screen display area, determine that the second sound effect is the video sound effect; or when the frame rate is greater than or equal to the preset frame rate, and the area proportion of the continuously refreshed area in the currently displayed picture is less than the preset proportion threshold of the screen display area, determine that the second sound effect is the audio sound effect; or when the frame rate is less than the preset frame rate, determine that the second sound effect is the audio sound effect.

In another possible implementation, the preset proportion threshold is 50%, and the preset frame rate is 24 Hz.

It should be understood that division of units or modules (hereinafter referred to as units) in the foregoing apparatus is merely logical function division. In actual implementation, all or some of the units or modules may be integrated into a physical entity, or may be physically separated. In addition, all the units in the apparatus may be implemented by software invoked by a processing element, or may be implemented by hardware; or some units may be implemented by software invoked by a processing element, and some units are implemented by hardware.

For example, the units may be separately disposed processing elements, or may be integrated into a chip for implementation, or may be stored in a memory in a form of a program and invoked by a processing element to implement functions of the foregoing units. In addition, all or some of these units may be integrated together, or may be implemented independently. The processing element described herein may also be referred to as a processor, and may be an integrated circuit that has a signal processing capability. In an implementation process, the steps in the foregoing method or the foregoing units may be implemented by using a hardware integrated logical circuit in the processing element, or by using instructions in a form of software.

In an example, the units in the foregoing apparatus may be one or more integrated circuits configured to implement the foregoing method, for example, one or more ASICs, one or more DSPs, one or more FPGAs, or a combination of at least two of these integrated circuit forms.

For another example, when the units in the apparatus may be implemented by using the processing element invoking a program, the processing element may be a general-purpose processor, for example, a central processing unit (central processing unit, CPU) or another processor that can invoke the program. For another example, these units may be integrated together, and implemented in a form of a system-on-a-chip (system-on-a-chip, SOC).

In an implementation, the foregoing apparatus may implement units corresponding to the steps in the foregoing method by a processing element invoking a program. For example, the apparatus may include a processing element and a storage element, and the processing element invokes a program stored in the storage element to perform the method described in the foregoing method embodiment. The storage element may be a storage element that is on a same chip as the processing element, that is, an on-chip storage element.

In another implementation, the program used to perform the foregoing method may be on a storage element that is on a different chip from the processing element, that is, an off-chip storage element. In this case, the processing element invokes or loads a program from the off-chip storage element onto the on-chip storage element, so as to invoke and perform the method described in the foregoing method embodiment.

For example, an embodiment of this application may further provide an apparatus. For example, the electronic device may include: a processor, and a memory configured to store an instruction that can be executed by the processor. When the processor is configured to execute the foregoing instruction, the electronic device is enabled to implement the sound playing method described in the foregoing embodiment. The memory may be located in the electronic device, or may be located outside the electronic device. In addition, there are one or more processors.

In still another implementation, the unit for implementing the steps in the foregoing method in the apparatus may be configured as one or more processing elements, and these processing elements may be disposed on the corresponding electronic device described above. The processing element herein may be an integrated circuit, for example, one or more ASICs, or one or more DSPs, or one or more FPGAs, or a combination of these types of integrated circuits. These integrated circuits may be integrated together to form a chip.

For example, an embodiment of this application further provides a chip, and the chip may be applied to the foregoing electronic device. The chip includes one or more interface circuits and one or more processors. The interface circuit is interconnected with the processor through a line. The processor receives and executes the computer instruction from the memory of the electronic device by using the interface circuit, so as to implement the method described in the foregoing method embodiment.

An embodiment of this application further provides a computer program product, including a computer instruction that is run by an electronic device, for example, the foregoing electronic device.

The foregoing descriptions about implementations allow a person skilled in the art to clearly understand that, for the purpose of convenient and brief description, division of the foregoing functional modules is used only as an example for illustration. In actual application, the foregoing functions can be allocated to different functional modules and implemented according to needs, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the purpose of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product, for example, a program. The software product is stored in a program product, such as a computer readable storage medium, and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a ROM, a RAM, a magnetic disk, or an optical disc For example, an embodiment of this application may further provide a computer readable storage medium, and the computer readable storage medium stores a computer program instruction. When the computer program instruction is executed by the electronic device, the electronic device implements the sound playing method described in the foregoing method embodiment.

The foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A sound playing method, comprising:
   determining, based on a name of a first application, that a category of the first application does not meet a preset condition, wherein the preset condition is that the category of the first application is one of a game, a video, or music;
   when the category of the first application does not meet the preset condition, playing a sound of the first application based on a sound effect parameter of a second sound effect corresponding to a frame rate of a current display of the first application, wherein playing the sound of the first application based on the sound effect parameter of the second sound effect corresponding to the frame rate of the current display of the first application comprises:
   determining, based on the frame rate of the current display of the first application, the second sound effect corresponding to the frame rate of the current display, wherein the second sound effect is a video sound effect corresponding to video, a gaming sound effect corresponding to gaming, or an audio sound effect corresponding to music, and wherein sound effect parameters configured for the video sound effect, the gaming sound effect, and the audio sound effect are different from each other; and
   playing the sound of the first application based on the sound effect parameter of the second sound effect.

2. The sound playing method according to claim 1, wherein determining, based on the frame rate of the current display of the first application, the second sound effect corresponding to the frame rate of the current display of the first application comprises:
   when the frame rate is greater than or equal to a preset frame rate, determining that the second sound effect is the video sound effect; and
   when the frame rate is less than the preset frame rate, determining that the second sound effect is the audio sound effect.

3. The sound playing method according to claim 1, wherein determining, based on the frame rate of the current display of the first application, the second sound effect corresponding to the frame rate of the current display of the first application comprises:
   when the frame rate is greater than or equal to a preset frame rate, and an area proportion of a continuously refreshed area in the current display of the first application is greater than a preset proportion threshold of a screen display area, determining that the second sound effect is the video sound effect.

4. The sound playing method according to claim 3, wherein determining, based on the frame rate of the current display of the first application, the second sound effect corresponding to the frame rate of the current display of the first application comprises:
   when the frame rate is greater than or equal to the preset frame rate, and the area proportion of the continuously refreshed area in the current display of the first application is less than the preset proportion threshold of the screen display area, determining that the second sound effect is the audio sound effect.

5. The sound playing method according to claim 4, wherein determining, based on the frame rate of the current display of the first application, the second sound effect corresponding to the frame rate of the current display of the first application further comprises:
   when the frame rate is less than the preset frame rate, determining that the second sound effect is the audio sound effect.

6. The sound playing method according to claim 4, wherein the preset proportion threshold is 50%, and the preset frame rate is 24 Hz.

7. The sound playing method according to claim 3, wherein the preset proportion threshold is 50%, and the preset frame rate is 24 Hz.

8. An electronic device, comprising:
   one or more processors; and
   one or more storage devices storing instructions that are operable, when executed by the one or more processors, to cause the one or more processors to perform operations for sound playing, the operations comprising:
   determining, based on a name of a first application, whether a category of the first application meets a preset condition, wherein the preset condition is that the category of the first application is one of a game, a video, or music;
   in response to determining that the category of the first application meets the preset condition, playing a sound of the first application based on a sound effect parameter of a first sound effect corresponding to the category of the first application; and
   in response to determining that the category of the first application does not meet the preset condition, playing the sound of the first application based on a sound effect parameter of a second sound effect corresponding to a frame rate of a current display of the first application, wherein playing the sound of the first application based on the sound effect parameter of the second sound effect corresponding to the frame rate of the current display of the first application comprises:

determining, based on the frame rate of the current display of the first application, the second sound effect corresponding to the frame rate of the current display of the first application, wherein the second sound effect is a video sound effect corresponding to video, a game sound effect corresponding to gaming, or an audio sound effect corresponding to music, and wherein sound effect parameters configured for the video sound effect, the gaming sound effect, and the audio sound effect are different from each other; and playing the sound of the first application based on the sound effect parameter of the second sound effect.

9. The electronic device according to claim 8, wherein playing the sound of the first application based on the sound effect parameter of the first sound effect corresponding to the category of the first application comprises:

determining, based on the category of the first application, the first sound effect corresponding to the category of the first application according to a preset correspondence between the category of the first application and the first sound effect; and playing the sound of the first application based on the sound effect parameter of the first sound effect.

10. The electronic device according to claim 9, wherein the category of the first application comprises a game, a video, or music; and wherein the preset correspondence between the category of the first application and the first sound effect comprises that a sound effect corresponding to gaming is the game sound effect, a sound effect corresponding to video is the video sound effect, and a sound effect corresponding to music is the audio sound effect.

11. The electronic device according to claim 8, wherein determining, based on the frame rate of the current display of the first application, the second sound effect corresponding to the first application comprises:

when the frame rate is greater than or equal to a preset frame rate, determining that the second sound effect is the video sound effect; and when the frame rate is less than the preset frame rate, determining that the second sound effect is the audio sound effect.

12. A non-transitory computer readable storage medium, wherein the non-transitory computer readable storage medium stores instructions, which, when executed by a data processing apparatus, cause the data processing apparatus to perform operations for sound playing, the operations comprising:

determining, based on a name of a first application, whether a category of the first application meets a preset condition, wherein the preset condition is that the category of the first application is one of a game, a video, or music;

in response to determining that the category of the first application meets the preset condition, playing a sound of the first application based on a sound effect parameter of a first sound effect corresponding to the category of the first application; and in response to determining that the category of the first application does not meet the preset condition, playing the sound of the first application based on a sound effect parameter of a second sound effect corresponding to a frame rate of a current display of the first application, wherein playing the sound of the first application based on the sound effect parameter of the second sound effect corresponding to the frame rate of the current display of the first application comprises:

determining, based on the frame rate of the current display of the first application, the second sound effect corresponding to the frame rate of the current display of the first application, wherein the second sound effect is a video sound effect corresponding to video, a game sound effect corresponding to gaming, or an audio sound effect corresponding to music, and wherein sound effect parameters configured for the video sound effect, the gaming sound effect, and the audio sound effect are different from each other; and playing the sound of the first application based on the sound effect parameter of the second sound effect.

13. The non-transitory computer readable storage medium according to claim 12, wherein playing the sound of the first application based on the sound effect parameter of the first sound effect corresponding to the category of the first application comprises:

determining, based on the category of the first application, the first sound effect corresponding to the category of the first application according to a preset correspondence between the category of the first application and the first sound effect; and playing the sound of the first application based on the sound effect parameter of the first sound effect.

14. The non-transitory computer readable storage medium according to claim 13, wherein the category of the first application comprises a game, a video, or music; and wherein the preset correspondence between the category of the first application and the first sound effect comprises that a sound effect corresponding to gaming is the game sound effect, a sound effect corresponding to video is the video sound effect, or a sound effect corresponding to music is the audio sound effect.

\* \* \* \* \*